United States Patent [19]

Gombault

[11] Patent Number: 4,943,369

[45] Date of Patent: Jul. 24, 1990

[54] METHOD AND APPARATUS FOR COMBINING A PLURALITY OF SERIALLY SUPPLIED SHEETS

[75] Inventor: Jacobus F. Gombault, Drachten, Netherlands

[73] Assignee: HADWE B. V., Drachten, Netherlands

[21] Appl. No.: 24,566

[22] Filed: Mar. 11, 1987

[30] Foreign Application Priority Data

Mar. 11, 1986 [NL] Netherlands ........................ 8600631

[51] Int. Cl.[5] .......................... B07C 5/34; G06K 9/00

[52] U.S. Cl. ................................ 209/583; 414/790.3; 414/790.5; 53/64; 271/176; 271/186; 271/213; 271/250

[58] Field of Search ............... 209/564, 569, 583, 653; 271/248, 250, 258, 265, 176, 184, 185, 186, 285, 213, 220, 221; 414/43, 45, 48, 49; 53/64, 65, 266 A; 270/58; 235/276, 280

[56] References Cited

U.S. PATENT DOCUMENTS

| | | | |
|---|---|---|---|
| 3,631,979 | 1/1972 | Frankiewicz et al. | 209/583 X |
| 3,646,325 | 2/1972 | George | 235/480 |
| 3,703,626 | 11/1972 | Shanrock | 235/476 X |
| 3,724,640 | 4/1973 | Rapparlie | 271/213 X |
| 4,145,606 | 3/1979 | Auchinleck et al. | 271/184 X |
| 4,204,640 | 5/1980 | Fuller | 235/476 |
| 4,524,557 | 6/1985 | Silverman et al. | 53/266 A |
| 4,707,790 | 11/1987 | Gomes et al. | 53/266 A X |

*Primary Examiner*—Joseph J. Rolla
*Assistant Examiner*—Edward S. Ammeen
*Attorney, Agent, or Firm*—Burns, Doane, Swecker & Mathis

[57] ABSTRACT

A method and apparatus for combining a plurality of serially supplied sheets into a set, depending on markings carried by the sheets and read by a reader, and discharging a set to a further handling station, such as an inserting machine. The leading edge of the first sheet of a set, and successively the remaining part of the sheet, is deflected out of its plane of transport, preferably downwardly and through about 180°, into a new plane of transport, in which the sheet is arrested in a flat condition. Each subsequent sheet of a set is similarly deflected and displaced into a position overlying the preceding sheet, and after thus completing the set, it is discharged. At choice, a set can be discharged with the leading edges being the edges that were the trailing edges during the supply of the sheets, or with one of the feed side edges of the sheets in leading position.

14 Claims, 2 Drawing Sheets

METHOD AND APPARATUS FOR COMBINING A PLURALITY OF SERIALLY SUPPLIED SHEETS

Figure 1:
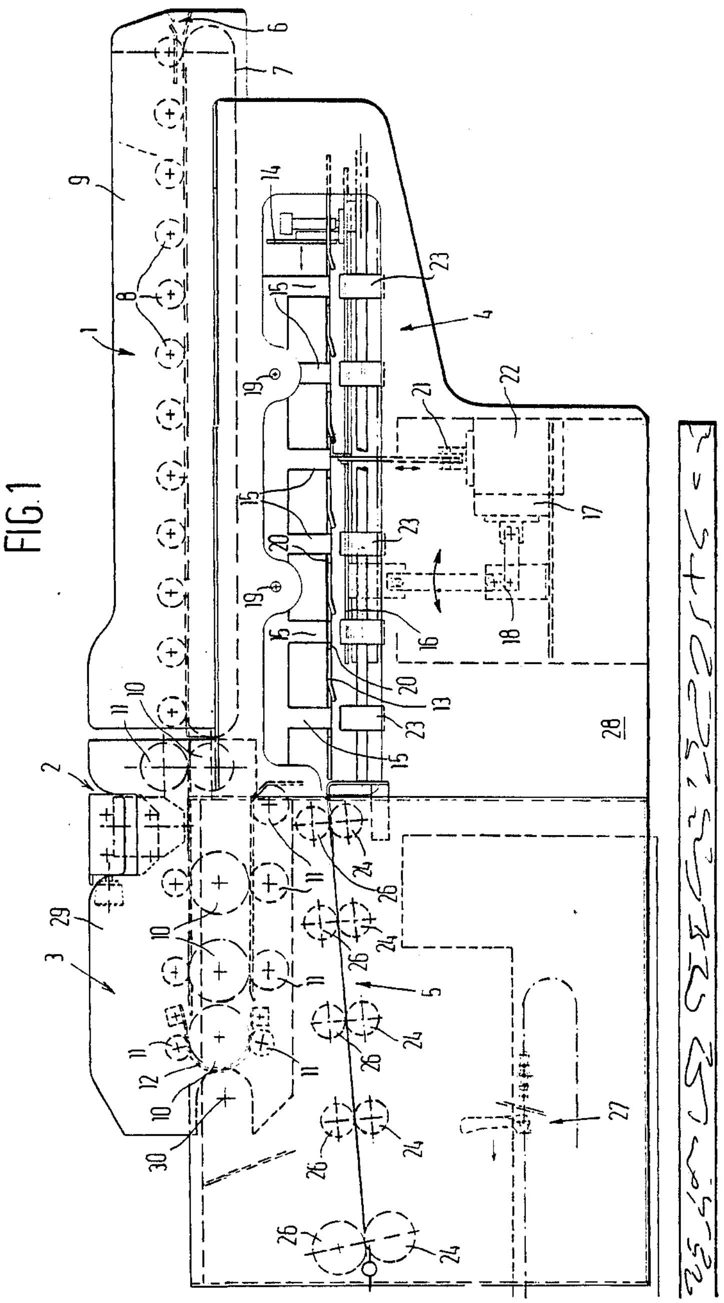

This invention relates to a method of combining a plurality of serially supplied sheets into a set, depending on markings carried by said sheets and read by a reader, and discharging a set to a further handling station, such as a inserting machine, and also to an accumulation station for carrying said method into effect.

Such an operation, as disclosed in US-A-4204640 or US-A-4524557, is primarily intended for fan-folded web output from a printer. The webs are separated into separate sheets in a burster or guillotine, while the markings carried by the sheets are read. The markings may contain various data, such as this sheet belongs to a certain set, separate enclosures must be added, the manner in which the set must be folded with or without enclosures, or inserted into an envelope, etc. Furthermore, at least the first sheet may be provided with an address, which later must be visible through the window of an envelope. During filling, an envelope preferably lies face down, and the flap extends against the direction of transport of the documents to be inserted into the envelope. This is done because in that case the most critical phase of the operation, the filling of the envelope, can best be monitored. Thus the documents should arrive at the filling station with the address face down, and with the bottom edge of the address-carrying side being in leading position, or the documents are lying upside down and bottom first.

To achieve this result, hitherto two routes have been followed. After separation, each sheet and each enclosure, if any, is separately folded or the fan-folded webs are supplied to the separator upside down and bottom first. The first method is time-consuming, owing to each sheet being individually folded, while each enclosure must be added already folded in the correct manner, which requires an additional folding device for the enclosure. Moreover, a free loose stack of separately folded sheets is obtained, which may provide problems in the introduction into the envelopes. The second method has the disadvantage that it cannot be carried out continuously. First a certain length of web must be printed before the further operation can be started. Furthermore, the last sheet of a set will become visible behind the window of the envelope, so that that sheet must also be provided with an address. Supplying the web upside down means that reading must be effected from below, which he can apply marks, because places where the reader heads can be placed in the bottom track of the guillotine or burster are limited. be placed in the bottom track of the guillotine or burster.

Furthermore, there is a strong trend towards using laser printers which are fed with loose sheets rather than fan-folded webs. In that case a separation device is unnecessary, so that reading the markings, as has hitherto been conventional, can no longer take place in such separating device.

It is an object of the present invention to provide a method which does not have the disadvantages described above.

To this effect, the present invention provides a method as defined in the opening paragraph hereof, which comprises deflecting and displacing the leading edge of the first sheet of a set, and successively the remaining part of the sheet out of its plane of transport into a new plane of transport in which the sheet is arrested in a flat condition, similarly deflecting and displacing each subsequent sheet of a set into a position overlying the preceding sheet, and after thus completing the set discharging the same. By virtue of these features, the method employs loose sheets, that is to say, either sheets first separated from a web, or sheets printed separately, to produce a set of sheets arranged in the desired manner, that is to say, a stack of collated sheets, with the printed side of the first sheet of the set being on the outside of the stack. By bodily reversing the set once again, a situation is obtained that is comparable to the above prior first method, except that the sheets now need not be folded separately, but the stack can be bodily treated as one whole. According to a further preferred embodiment, however, a set is discharged with the leading edges being the edges that were the trailing edges during the supply of the sheets. The address on the first sheet is then at the bottom trailing side, and the further treatment can be effected by the above-described known second method except, however, that, in the present method, the markings have already been read beforehand from the top, which gives much more liberty in the location of the markings, and the first sheet of a set appears behind the window of the envelope.

It may be desirable for a certain set to be not supplied to a filling station, but to be deposited elsewhere. In accordance with a further embodiment of the invention, this can be effected in a simple manner if a set is diverted with one of the two side edges of the sheets in leading position. In addition it is then possible to divert a complete set, if the reader has detected an incorrectness in one of the sheets of the set. This is not possible with existing systems, which all divert the loose sheets before they are collated.

If, in accordance with a further embodiment of the invention, each sheet is deflected through about 180°, it is possible to carry out the operation in a limited space, as, in that case, the first and the second transport planes can extend substantially parallel and one underneath the other.

Deposition on the second transport plane is optimized, if, in accordance with a further embodiment of the present invention, each sheet is deflected out of its plane of transport in a downward direction. This also makes for optimized disposition of the reader, such that the markings carried by the sheets are read immediately prior to the deflection of the sheet from its plane of transport. The reading of the markings carried by the sheets can be further optimized if, prior to reading, each sheet is oriented and can be arrested in that oriented position. By this feature it is ensured that reading always takes place in the same, desired manner, while as soon as a preceding set has vacated the collecting position, a sheet can be laid in position ready to be read.

The present invention also relates to an accumulation station for combining a plurality of serially supplied sheets to a set, depending on signals from a reader, and discharging the set to a further handling station, such as a filling machine. In accordance with the present invention, such an accumulation station comprises:

an input for receiving successive loose sheets;

a deflector disposed downstream of said input and comprising a driven reversing roller and guide means defining a transport path extending from said input to said reversing roller in a direction tangent to said roller, then following part of the circumference of said roller to form a sheet deflecting path and finally extending away from said roller in a direction tangent to the circumference thereof; and a collecting table with discharge means, disposed downstream of said deflector.

This arrangement provides relatively simple, but effective means for forming a set of collated sheets. A set can be discharged in the preferred manner discussed above, if, in accordance with a preferred embodiment of the invention, the discharge means is a stop which, as viewed from the deflector, is the rear end of the collecting table, and is arranged for controlled movement in the direction of the deflector, the guide means from the reversing roller to the collecting table terminating at a point spaced from, and over the table surface, whereat discharge means are provided between said guide means and said table. In addition, such a stop can fairly easily be arranged to be adjustable relative to the table moving device to provide for adaptation to different lengths of sheets being processed.

In order that the formation of a set may as little as possible be the cause of inserting machine idling periods, it is preferred, and in accordance with a further embodiment of the present invention, that the discharge means of the collecting table links up with at least one waiting station having an output linking up with a supply means for a further handling station.

If necessary, a set can be deposited elsewhere, rather than transported to the filling machine if, in accordance with a further embodiment of the present invention, the collecting table is arranged for hinging movement about its longitudinal axis, with means being provided for tilting the collecting table, relatively to its collecting position in both directions.

As the accumulation station operates with loose sheets, it is preferred, and in accordance with a further embodiment of the present invention, that the input is a table with a side guide and means for orienting a sheet along said side guide. In that case, not only is correct supply to the deflector ensured, but also correct and accurate reading of the markings on the sheets promoted, if in accordance with a further embodiment of the invention, the reader is disposed between the inlet and the deflector.

In order that all regions of the accumulation station may be optimally accessible to remedy any irregularities, such as paper jams, it is preferred, and in accordance with a further embodiment of the present invention, that the input, the reader, and the deflector are mounted in a frame that can be pivoted away from the collecting table.

The method and the accumulation station according to the present invention will now be described and elucidated in more detail with reference to an exemplary embodiment shown in the accompanying drawings. In said drawings, FIG. 1 shows an accumulation station according to the present invention in side-elevational view; and FIG. 2 shows a collecting table in front-elevational view.

Figure 2:
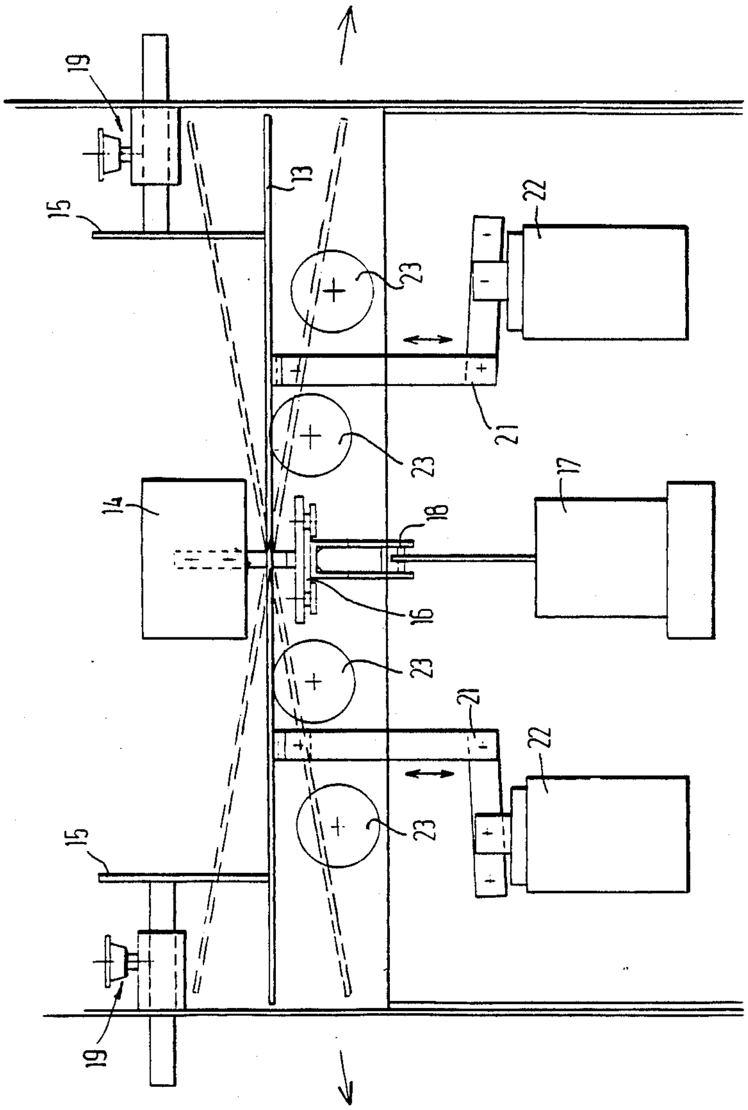

The accumulation station shown in FIG. 1 comprises a supply table 1, a reader 2, a deflector 3, a collecting table 4, and a waiting station 5.

Supply table 1 is provided with an input 6, linking up with a conveyor 7. Placed over conveyor belt 7 is a holder with hold-down balls 8. Furthermore, the supply table comprises means, for example, a conveyor belt 7 disposed obliquely to its longitudinal direction, for guiding a sheet introduced, so that this will contact a longitudinal guide edge, for example, side wall 9, throughout its full length.

Linking up with supply table 1 is deflector 3, which comprises a plurality of driven rollers 10, arranged to cooperate with a plurality of freely rotating rollers 11 for transporting a sheet further. Placed intermediate the first and the second set of rollers, as viewed in the direction of transport, is reader 2 with an adjustable reader head. Extending around a portion of the circumference of the last roller 10 is a guide 12, leaving a transport gap between roller 10 and guide 12 for the guided deflection of a sheet.

Collecting table 4 is provided with a support surface 13 bounded by an end stop 14 and side guides 15. End stop 14 is adjustably secured to a pulling strip 16 which by means of an electromagnet 17 and a lever transmission 18 is reciprocable in the longitudinal direction of support surface 13. As best shown in FIG. 2, side guides 15 are adjustable transversely to the longitudinal direction of support surface 13 by adjusting means 19. In order that there may be no gap between side guides 15 and support surface 13, the latter is provided with recesses 20, so that the lower edges of the side guides may extend below the top of support surface 13. The upstream edges of recesses 20 are curved downwards to prevent such edges from functioning as abutments. Support surface 13 is arranged for tilting movement about its central longitudinal axis, which tilting movements can be controlled by means of lever transmission 21 through electromagnets 22. When tilted, support surface 13 is moved in such a manner that sheets carried by it are engaged by driven transport rollers 23 which, for this purpose, are disposed below support surface 13, so that when support surface 13 is tilted transport rollers 23 can extend through recesses 20.

Linking up with the end of support surface 13 located opposite that where end stop 14 is provided, is the input of the waiting station 5, which is provided with controlled driven rollers 24 and freely rotating rollers 26. Disposed under the outlet of waiting station 5 is a finger conveyor 27 leading, for example, to a filling machine.

Collecting table 4 and waiting station 5 are mounted in a main frame 28. Table 1 and deflector 3 are supported by an auxiliary frame 29, which is pivotable about a shaft 30 relatively to main frame 28. In this way the accumulation station can be opened, so that all its parts are properly accessible, and any irregularities, such as paper jams, can be remedied in a simple manner.

The operation of the accumulation station is as follows.

A sheet from a separator or a sheet printer is fed through input 6 to conveyor belt 7, where balls 8 hold down the sheet. Lying on table 1, the sheet is oriented.

If deflector 3 is not vacated, which is indicated by a signal from reader 2, transportation on table 1 is stopped when the leading edge of the sheet reaches a pre-determined position. As soon as deflector 3 is vacated, a new signal is given, and the sheet is supplied to deflector 3, whereby markings carried by the sheet are read by reader 2.

Further transport in deflector 3 takes the sheet to deflection guide 12, whereby the sheet is fed to collecting table 4 upside down and in a reversed position. The movement of the sheet is stopped by end stop 14, so that the sheet comes to lie on support surface 13, oriented by side guides 15. Depending on the observations of reader 2, more sheets may be fed, which come to lie on top of the first sheet until a set is complete. Reader 2 also determines what is further done with a set. If it should not be fed to the filling machine, but diverted, reader 2 will give a signal energizing electromagnets 22, which cause supporting surface 13 to tilt, whereby the set comes into contact with rollers 23 and is diverted laterally. If reader 2 has detected an incorrectness, supporting surface 13 can be tilted to the other side, and the set is diverted laterally to the other side.

If a set should be transported further to the inserting machine, reader 2 generates a signal energizing electromagnet 17, which results in end stop 14 being moved in the direction of waiting station 5, and in the set being thus fed to waiting station 5.

The transportation of the set in waiting station 5 is terminated when the leading edge of the set, i.e. the bottom edges of the sheets, reaches the last set of rollers 24, 26, as viewed in the direction of transport. At that moment, the set has fully left supporting surface 13, and a next set can be formed. The transport of the first set is resumed when sollicited by finger conveyor 27.

It goes without saying that many modifications and variants with respect to the embodiment described above and shown in the accompanying drawings can be made without departing from the scope of the invention. Thus, without affecting the essential operation of the accumulation station, the use of table 1 and/or waiting station 5 can be dispensed with. Also, for example, reader 2 can be placed in an upstream separator. Furthermore, collecting table 14 may be provided with conveyor means other than those shown, for example, conveyor belts. Naturally, it is also possible to have more than one waiting station, while a set of sheets may be supplied from the collecting table to a further deflector which bodily reverses the set, after which it can be processed further.

What is claimed is:

1. A method of combining a plurality of serially supplied sheets into a set according to data carried by said sheets and read by a reader, and discharging the set to a further handling station, which comprises reading the data on a first sheet of the set, subsequently deflecting and displacing the remaining part of the sheet, out of its plane of transport into a new plane of transport, arresting said first sheet in a flat condition, reading the data from each subsequent sheet and similarly deflecting and displacing each subsequent sheet of a set into a position overlying the preceding sheet, and discharging the set in a predetermined direction depending upon the data read from the sheets after thus completing the set.

2. A method as claimed in claim 1, wherein a set is discharged with the leading edges being the edges that were the trailing edges during the supply of the sheets.

3. A method as claimed in claim 1, wherein a set is discharged with one of the side edges of the sheets in leading position.

4. A method as claimed in claim 1, wherein each sheet is deflected through about 180°.

5. A method as claimed in claim 1, wherein each sheet is deflected out of its plane of transport in a downward direction.

6. A method as claimed in claim 1, wherein the data carried by the sheets are read immediately before a sheet is deflected out of its plane of transport.

7. A method as claimed in claim 6, wherein prior to reading, each sheet is oriented and can be arrested in that oriented position.

8. An accumulation station for combining a plurality of serially supplied sheets into a set according to data carried by said sheets and read by a reader, and discharging the set to a further handling station, said accumulation station comprising:

an input for receiving successively loose sheets;

a reader for reading data carried by the sheets;

a deflector disposed downstream of said input and comprising a driven reversing roller and guide means defining a transport path extending from said input to said reversing roller in a direction tangent to said roller, said transport path following part of the circumference of said roller to form a sheet deflecting path, said deflecting path extending away from said roller in a direction tangent to the circumference thereof;

a collecting table having means for discharging said set, said collecting table being disposed downstream of said deflector; and said means for discharging said set being arranged to discharge the set in a predetermined direction depending upon the data read from the sheets.

9. An accumulation station as claimed in claim 8, wherein the input comprises a table with a side guide and means for orienting a sheet along said side guide.

10. An accumulation station as claimed in claim 9, wherein the reader is disposed between the input and the deflector.

11. An accumulation station for combining a plurality of serially supplied sheets into a set according to data carried by said sheets and read by a reader, and discharging the set to a further handling station, said accumulation station comprising:

an input for receiving successive loose sheets;

a deflector disposed downstream of said input and comprising a driven reversing roller and guide means defining a transport path extending from said input to said reversing roller in a direction tangent to said roller, said transport path following part of the circumference of said roller to form a sheet deflecting path, said deflecting path finally extending away form said roller in a direction tangent to the circumference thereof; and a collecting table having means for discharging said set disposed downstream of said deflector, said means for discharging said set comprising a stop which, as viewed from the deflector, is located at the rear end of the collecting table, and is adjustably secured to a pulling strip for controlled movement of said set in the direction towards the deflector, the guide means from the reversing roller to the collecting table terminating at a point spaced from, and over the table surface, and discharge means provided between said guide means and said table.

12. An accumulation station as claimed in claim 11 wherein the means for discharging said set is linked with at least one waiting station having an output linked with a means for supplying a set to a further handling station.

13. An accumulation station for combining a plurality of serially supplied sheets into a set according to data carried by said sheets and read by a reader, and discharging the set to a further handling station, said accumulation station comprising:

an input for receiving successive loose sheets;

a deflector disposed downstream of said input and comprising a driven reversing roller and guide means defining a transport path extending from said input to said reversing roller in a direction tangent to said roller, said transport path following part of the circumference of said roller to form a sheet deflecting path, said deflecting path finally extending away form said roller in a direction tangent to the circumference thereof; and a collecting table having means for discharging said set disposed downstream of said deflector, said collecting table arranged for hinging movement about its longitudinal axis, with means being provided for tilting the collecting table, relatively to its collecting position, in both directions.

14. An accumulation station for combining a plurality of serially supplied sheets into a set according to data carried by said sheets and read by a reader, and discharging the set to a further handling station, said accumulation station comprising:

an input for receiving successive loose sheets, said input comprising a table with a side guide and means for orienting a sheet along said side guide;

a deflector disposed downstream of said input and comprising a driven reversing roller and guide means defining a transport path extending from said input to said reversing roller in a direction tangent to said roller, said transport path following part of the circumference of said roller to form a sheet deflecting path, said deflecting path finally extending away form said roller in a direction tangent to the circumference thereof;

a collecting table having means for discharging said set disposed downstream of said deflector, said means for discharging said set comprising a stop which, as viewed from the deflector, is located at the rear end of the collecting table, and is adjustably secured to a pulling strip for controlled movement of said set int he direction towards the deflector;

a reader disposed between the input and the deflector; and a frame pivotable about a shaft in a direction away from the collecting table having the input, the reader, and the deflector disposed thereon.

* * * * *

UNITED STATES PATENT AND TRADEMARK OFFICE

CERTIFICATE OF CORRECTION

PATENT NO. : 4,943,369

DATED : July 24, 1990

INVENTOR(S) : Gombault

It is certified that error appears in the above-identified patent and that said Letters Patent is hereby corrected as shown below:

On the title page:

In the Assignee section, "HADWE B. V." should read -- HADEWE B. V. --.

Signed and Sealed this

Nineteenth Day of May, 1992

*Attest:*

DOUGLAS B. COMER

*Attesting Officer*

*Acting Commissioner of Patents and Trademarks*